June 6, 1961   R. LEVI ET AL   2,986,799
METHOD OF MAKING CATHODES
Filed Jan. 3, 1957
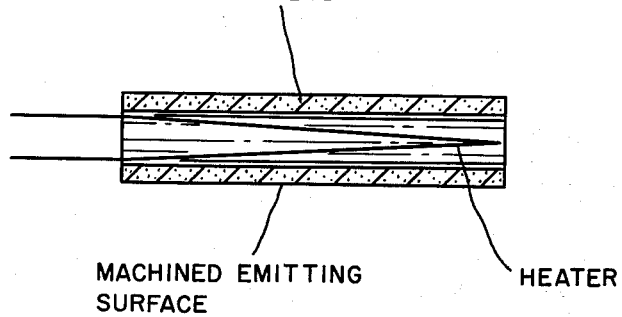
MACHINED EMISSIVE-MATERIAL-IMPREGNATED BODY
MACHINED EMITTING SURFACE
HEATER
INVENTORS
ROBERTO LEVI
JACK OISHER
BY
AGENT 2,986,799
METHOD OF MAKING CATHODES
Roberto Levi, New York, and Jack Oisher, Bronx, N.Y., assignors to North American Philips Company, Inc., New York, N.Y., a corporation of Delaware
Filed Jan. 3, 1957, Ser. No. 632,294
6 Claims. (Cl. 29—25.18)

This invention relates to a method of making cathodes and devices containing cathodes, and in particular to cathodes of the dispenser-type employing a refractory metal.

United States Patent No. 2,700,000 describes a dispenser-type cathode constituted of a tungsten matrix impregnated with an alkaline earth metal composition. When heated, the alkaline earth metal composition reacts with the surrounding tungsten to generate free alkaline earth metal in vapor form, which diffuses through and along the pores of the matrix until it reaches an exterior surface thereof, on which it forms a monatomic layer of alkaline earth metal. This layer materially reduces the work function of the subjacent, tungsten surface. The result is a cathode exhibiting the properties of extremely high emission density, long life, and high resistance to ion bombardment. The known technique for making this type of cathode is as follows. Tungsten powder of the desired particle size and distribution is compacted to form a bar-shaped ingot, and the ingot subsequently sintered at a very high temperature, e.g. 2400° C., to produce a very hard, strong, fully-sintered, tungsten matrix having a density of about 83% of the theoretical density of a non-porous, tungsten body. Since the sintering process involves considerable shrinkage and warpage, subsequent machining of the ingot to produce cathode bodies of the desired shape and dimensions is essential. To this end, the porous, tungsten matrix, which is normally unmachinable, is impregnated with a metal such as copper. As is disclosed in United States Patent No. 2,669,008, this renders the composite body machinable by standard cutting techniques known in the field; for example, the ingot is usually turned down in a lathe to form an elongated cylindrical body of, for example, ⅜ inch diameter and 1¼ inches long; then, to make planar cathodes, the body is sliced up to form flat, disc-shaped bodies of about 0.040 inch thick in a lathe. To make cylindrical cathodes, the ingot is sliced up into the lengths of cathodes desired, and then a hole drilled through the center to form the usual hollow, cylindrical cathode. The drilling may take place in a lathe or drill press, as desired. The bodies so produced, having the required shape and dimensions, are next placed in a vacuum furnace, which is then evacuated and heated to a temperature below the sintering temperature of the tungsten ingot and above the melting temperature of copper, so that the copper volatilizes and is expelled completely from the tungsten matrix, the lower volatilization temperature precluding further shrinkage of the matrix, and thus maintaining dimensional stability. There thus results a porous, fully-sintered, hard, strong, tungsten body having the required shape and dimensions dictated by its application. The body is then placed in contact with powdered barium aluminate, and the combination heated in a non-oxidizing atmosphere, which may be neutral or reducing, so that the aluminate melts and impregnates the tungsten matrix. The resultant emissive-material-impregnated-body is finally mounted in a suitable support, usually housing a heater, which support may then be mounted in an envelope of a discharge device as a source of electrons therefor.

The foregoing technique is time-consuming, expensive and cumbersome, which is a result of the need for including the copper impregnation step to enable the porous body to be machined to produce cathode bodies of the desired shape and dimensions.

It is an object of the invention to provide a new method for making dispenser-type cathodes which is more economical than known methods.

It is another object of the invention to provide a method for making dispenser-type, impregnated cathodes in which the need for expensive equipment, such as a vacuum furnace, is obviated.

Still a further object of the invention is a method for making dispenser-type cathodes in which the prior art technique of copper impregnation to facilitate machining is avoided.

The invention is based upon two new and unexpected discoveries. First, that it is possible to impregnate fully and satisfactorily large, porous, refractory-metal bodies with electron-emissive material, and second, and more important, that it is possible to machine directly a hard, strong, refractory-metal ingot impregnated with electron-emissive material. Briefly, then, the method of the invention involves forming and impregnating a hard, strong, fully-sintered, porous, refractory-metal ingot with certain electron-emissive materials. Next, the emissive-material-impregnated, refractory-metal body is directly machined or cut to form cathode bodies of the required shape and dimensions as desired. Finally, the machined bodies are assembled in the usual support and mounted in a discharge device ready for use.

The advantages possessed by the method of the invention over the prior art technique are the following. First and foremost, the copper impregnation and subsequent volatilization steps are avoided in the manufacture of the machined bodies, thereby reducing by two expensive and time-consuming steps the manufacture of these cathodes. Further, the need for expensive vacuum furnaces and the like is obviated as a corollary of the elimination of the copper-volatilization step, reducing by a very large amount the cost of capital equipment necessary to carry out the production of such cathodes. Finally, it makes possible the use of a completely novel, distributing technique in the discharge tube field, which involves distribution of an emissive-material-impregnated, refractory-metal ingot directly to the tube manufacturer, whereupon the tube manufacturer himself, without the need of special equipment, can machine directly the ingot into cathodes of the desired shape, and finally simply mount as usual in the tube desired.

The preparation of cathodes in accordance with the invention will now be described in greater detail.

As in previous techniques, the preparation commences with the formation of the hard, strong, fully-sintered, porous, refractory-metal body. While other refractory metals may be used, as will be explained later, the preparation of a tungsten matrix will be described to illustrate the method of the invention, as this produces the best cathodes and is the preferred material. First, tungsten powder particles of a desired particle size and distribution are compacted to form a body, and the body then sintered at a relatively high temperature so that considerable grain growth occurs. For example, such a body may have the dimensions of 1 and ½ inches long and ⅜ inch square in cross-section. United States Patent No. 2,669,008 describes in detail a method for making such a body, and thus further description is unnecessary. It is preferred that the characteristics of the tungsten powder and the compacting pressure be such that the desired density of the tungsten ingot or body be reached by sintering at not less than about 1800° C., which latter value should be above the temperature required to impregnate subsequently with the molten, emissive material.

The density of the tungsten ingot or bar-shaped body should be at least about 60% and not more than about 90% of the theoretical density of a non-porous bar, and the preferred value is about 83%. Naturally the pores in the body should be uniformly distributed and interconnected.

The porous matrix of tungsten thus produced, which is hard and strong and normally unmachinable, is next impregnated with an electron-emissive material. United States Patent No. 2,700,000 describes in detail one such method employing, for example, an oxidic, emissive material comprising a fused mixture of barium carbonate and aluminum oxide in a 5:2 mole ratio. The mixture of powders may be first fused in air to produce an aluminate, the fused mass then being pulverized back to the powdered state. The resultant powder is placed adjacent the tungsten bar and the combination heated to about 1750° C. (optical) in a non-oxidizing, i.e., neutral or reducing, atmosphere, so that the aluminate melts and then flows into the porous, tungsten matrix by capillary action. It is necessary to maintain the heating until the bar of tungsten is fully impregnated, which, depending upon the dimensions of the bar, may take between about ½ minute and about thirty minutes. The lower figure is based upon the fact that it requires a certain interval of time before complete penetration of the bar by the emissive-material occurs. The higher figure derives from the fact that at the temperature of the impregnation step, a deleterious reaction between the emissive material and the tungsten takes place, which, if allowed to go on for too long a time, or if carried to completion, will result in the conversion of the emissive material into another compound not capable of enhancing the emission of the tungsten metal. It will thus be appreciated that, in general, the impregnation time should be a minimum, which would tend toward the employment of smaller-sized bars, so as to ensure that the impregnation is complete before the said deleterious reaction has been carried too far. For the size-bar indicated above, a time of about twenty minutes has been found sufficient.

One of the unexpected results of the invention, indicated before, is that relatively large bars of tungsten may be completely impregnated with emissive material, from which bars many, satisfactory cathodes may be made. Prior to the invention, only members having thicknesses no larger than 0.070 inch had been impregnated, and it had not been realized that it was possible to impregnate bars of the large size above indicated with sufficient speed so that complete penetration resulted before the aforesaid deleterious reaction had been carried too far. The complete penetration is essential because the portions of the bar not impregnated are not readily machinable.

Many emissive materials may be employed in cathodes made by the method of the invention. They include not only the barium aluminate described above, but also the barium silicate and barium borate described in the aforesaid Patent No. 2,700,000. Also, the improved emissive material described in United States application, Serial No. 487,042, filed February 9, 1955, may be employed. This material includes the addition of some calcium oxide or strontium oxide to the emissive composition for the purpose of increasing the emission and shortening the aging time of the resultant cathode. It has also been found that this improved impregnant is in fact the preferred emissive material for making cathodes in accordance with the invention. This is a consequence of the fact that the addition of the calcium oxide or the strontium oxide improves the ability of the electron-emissive material to wet the tungsten, so that it flows more rapidly into the pores of the tungsten matrix and requires less time for impregnation for a given sized bar, which allows the use of larger-sized bars as desired while remaining within the allowed times of impregnation. As a specific example thereof, a mixture of barium carbonate, aluminum oxide and calcium carbonate in a 5:2:3 mole ratio was prefused in air to form aluminates and subsequently pulverized to a powder. The powder was then placed in contact with the tungsten bar and heated in a neutral or a reducing atmosphere at about 1750° C. (optical) to cause the powder to melt and to fill up the pores of the tungsten matrix by capillary action. For a ⅜ inch square bar, 1 and ½ inches long, an impregnation time of about ten minutes was satisfactory. In addition, fused mixtures of barium carbonate, silicon dioxide and calcium carbonate in a 3:1:½ mole ratio are satisfactory. As also described in the copending application, the mole ratios of the materials are not very critical.

Another emissive material which is operable in the invention is that described in United States patent application, Serial No. 599,748, filed July 24, 1956. That material is barium oxide alone or a mixture of barium oxide with strontium oxide or calcium oxide. In the same manner, the starting ingredients, which are the corresponding alkaline earth metal carbonates, are prefused, the fused mass pulverized, and the resultant powder mixture heated at 2000° C. (optical) while in contact with the tungsten bar to impregnate the same. In general, then, suitable electron-emissive materials include all oxidic, alkaline earth metal compositions, which, when dispersed throughout a refractory-metal matrix and suitably heated, are capable of forming an alkaline earth metal layer on a surface of the matrix, which materially reduces the work function of that surface and enables copious electrons to be withdrawn therefrom. Such compounds will, as a rule, include barium oxide alone or as a fused mixture with an amphoteric oxide with or without other alkaline earth metal oxides.

As the non-oxidizing atmosphere in which the impregnation is carried out, it is preferred to use hydrogen at atmospheric pressure, because the presence of the atmosphere reduces the rate at which the barium constituent of the emissive material vaporizes from the liquid emissive material, and reduces the rate at which the deleterious reaction above-mentioned is carried out, and also because the hydrogen seems to promote the wetting of the tungsten by the liquid emissive material. By employing hydrogen at atmospheric pressure, an open-bell jar type of furnace is suitable, which may be obtained at relatively low cost. Equally satisfactory is a slightly-less-reducing atmosphere, such as a mixture of nitrogen and hydrogen obtained by catalytic cracking of anhydrous ammonia. These are the preferred atmospheres. Satisfactory results have also been obtained with nitrogen, and rare gasses such as helium. Vacuum as a non-oxidizing atmosphere has also proven satisfactory, though this is preferably employed only with the smaller-sized bars.

The machining, i.e., the material-removal operation by cutting, of the emissive-material-impregnated bar is straightforward, except that, preferably, no liquid coolants are employed. For example, the bar may be turned-down, faced-off, drilled, and sliced apart in a lathe, as well as milled, planed, bored, and subjected to other standard cutting operations, all at room temperature. Refractory-metal-carbide-tipped tools should preferably be used. By these operations, very smooth surfaces are obtainable, which makes for better cathodes with more uniform emission. Also, sharp corners and even threads can be satisfactorily machined, and, of course, dimensions within very close tolerances are obtainable. The tool wear is somewhat greater than that encountered in the machining of the copper-impregnated tungsten body, but this is a relatively small price to pay for the elimination of the copper impregnation and subsequent volatilization steps. In fact, this is truly a remarkable and unexpected result of the invention, namely, that this hard, strong, fully-sintered, porous, tungsten matrix, which is normally unmachinable, is rendered machinable by the filling up of its pores with an emissive material which is itself relatively hard and brittle. The tungsten bar impregnated with the improved impregnant comprising the barium aluminate with the addition of calcium oxide or strontium oxide is the best machinable of the impregnants described, and is therefore the preferred emissive material.

Since larger-sized tungsten bars require longer impregnation times, there is a tendency to lose by vaporization barium or barium oxide from the emissive material during the impregnation or melting-in step, as an excessive time may be required to obtain complete penetration. In such event, it is preferred to increase the BaO content of the initial emissive material, so that the quantity thereof in the completed cathode remains within desired limits. So, for example, one may start with a 6:2 mole ratio of barium carbonate to aluminum oxide, thus ensuring this result.

While cathodes made entirely of tungsten have been described, it will be appreciated that other refractory metals which produce hard, strong matrices can be used, though the tungsten is clearly the preferred material, and being the hardest of the refractory metals and the least machinable exhibits the most pressing need for the inventive technique. In particular, the matrix may comprise an alloy of molybdenum and tungsten, preferably with the tungsten predominating, so that the rate of generation of the barium vapor can be controlled. Similarly, alloys of molybdenum and tantalum may also be employed. When using tantalum, it is preferred to carry out the impregnation and sintering in a helium atmosphere.

The impregnated cathode bodies formed during the machining operation are then assembled in the usual way in a suitable support of, for example, molybdenum, to which is added a heater, and the combination sealed in the envelope of a discharge device. The activation of the cathode is identical to that of the cathodes made by the prior art technique and usually consists of heating the cathode within the device on the pumping system for a short time at a temperature of about 50° C. above the desired operating temperature.

The accompanying drawing is a cross-sectional view of a typical cylindrical dispenser cathode made by the invention. The inside hole, containing the heater, is usually formed by drilling, and the outside surface, which is the emitting surface, is usually formed by turning in a lathe and thus rendered smooth.

Cathodes made by the technique of the invention have been found to be identical in all respects to cathodes made by the prior art technique. However, the inventive method possesses the enormous advantages of a material reduction in cost and time in the preparation of the cathodes, a lowering of the possible sintering temperatures of the refractory-metal matrix, and a tremendous reduction in the cost of capital equipment, all a consequence of the elimination of the copper impregnation and volatilization steps. Further, it has materially simplified the distribution of cathodes to the tube manufacturer, since they may now be supplied with an electron-emissive-material-impregnated tungsten bar of relatively large size, from which they may carve or machine cathodes of different shapes and dimensions as desired. Thus, it is considered that the method of the invention constitutes an important improvement in the art of making dispenser-type cathodes.

While the invention has been described in connection with specific embodiments, other modifications thereof will be readily apparent to those skilled in this art without departing from the spirit and scope of the invention as defined in the appendant claims, and thus it is to be understood that the invention is not to be limited to the specific examples recited above.

What is claimed is:

1. A method of manufacturing an electron device containing an electron-producing cathode, comprising forming a hard, strong, fully-sintered, porous tungsten member with a density between 60% and 90% of the theoretical density of a non-porous body and whose pores are filled with an oxidic composition including barium capable of reacting when heated with tungsten in a manner productive of free barium vapor, subjecting said formed member to a machining cutting operation to remove material and form a body of given shape and dimensions having a smooth external surface portion, and thereafter assembling said machined body with said oxidic composition in its pores in a device in electron-producing relationship therein.

2. A method as set forth in claim 1, wherein the oxidic composition is the reacted product of barium oxide and an amphoteric oxide.

3. A method of manufacturing an electron device containing an electron-producing cathode, comprising forming a hard, strong, fully-sintered, porous tungsten member with a density between 60% and 90% of the theoretical density of a non-porous body, impregnating the pores of said member with a molten oxidic composition including barium capable of reacting when heated with tungsten in a manner productive of free barium vapor, subjecting said impregnated formed member to a machining cutting operation to remove material and form a body of given shape and dimensions having a smooth external surface portion, and thereafter assembling said machined body with said oxidic composition in its pores in a device in electron-producing relationship therein.

4. A method as set forth in claim 3 wherein the impregnation is carried out in a reducing atmosphere, and the oxidic composition is a mixture of barium carbonate and aluminum oxide.

5. A method as set forth in claim 4 wherein the oxidic composition includes calcium oxide.

6. A method of manufacturing an electron device containing an electron-producing cathode, comprising forming a hard, strong, fully-sintered, porous tungsten member with a density of about 83% of the theoretical density of a non-porous body, filling the pores of said body in a hydrogen-containing atmosphere with a melt of an oxidic composition comprising barium oxide, aluminum oxide and calcium oxide which is capable of reacting when heated with tungsten in a manner productive of free barium vapor, subjecting said thus-formed and filled member to a machining cutting operation to remove material and form a body of given shape and dimensions having a smooth external surface portion, and thereafter assembling said machined body with said oxidic composition in its pores in a device in electron-producing relationship therein.

References Cited in the file of this patent

UNITED STATES PATENTS

| | | |
|---|---|---|
| 2,304,166 | Hatfield | Dec. 8, 1942 |
| 2,663,928 | Wheeler | Dec. 29, 1953 |
| 2,700,000 | Levi et al. | Jan. 18, 1955 |
| 2,721,372 | Levi | Oct. 25, 1955 |